(12) United States Patent
Tang

(10) Patent No.: US 8,605,451 B2
(45) Date of Patent: Dec. 10, 2013

(54) CHIP CARD HOLDING MECHANISM AND PORTABLE ELECTRONIC DEVICE USING SAME

(75) Inventor: Zi-Ming Tang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 256 days.

(21) Appl. No.: 13/281,630

(22) Filed: Oct. 26, 2011

(65) Prior Publication Data

US 2013/0044452 A1    Feb. 21, 2013

(30) Foreign Application Priority Data

Aug. 15, 2011  (CN) .......................... 2011 1 0232863

(51) Int. Cl.
*H05K 5/00* (2006.01)
(52) U.S. Cl.
USPC ................. 361/754; 361/679.31; 361/679.32; 361/679.38; 361/679.39; 361/727
(58) Field of Classification Search
USPC ......... 361/737, 748, 752, 754, 759, 769, 787, 361/798, 801, 807, 825, 829, 361/679.31–679.32, 679.38–679.39, 727
See application file for complete search history.

(56) References Cited

U.S. PATENT DOCUMENTS

| | | | |
|---|---|---|---|
| 6,991,480 B2 * | 1/2006 | Katayanagi et al. .......... | 439/159 |
| 7,066,748 B2 * | 6/2006 | Bricaud et al. ................ | 439/159 |
| 7,081,020 B1 * | 7/2006 | Lee ............................... | 439/630 |
| 8,270,175 B2 * | 9/2012 | Duan et al. .................... | 361/737 |
| 8,371,878 B2 * | 2/2013 | Tang ............................. | 439/630 |
| 2004/0092149 A1 * | 5/2004 | Scuteri et al. ................. | 439/326 |
| 2011/0255252 A1 * | 10/2011 | Sloey et al. ................... | 361/752 |

* cited by examiner

*Primary Examiner* — Jayprakash N Gandhi
*Assistant Examiner* — Hung Dang
(74) *Attorney, Agent, or Firm* — Altis Law Group, Inc.

(57) ABSTRACT

A portable electronic device includes a housing and a chip card holding mechanism assembled within the housing. The housing defines a mounting slot and an unlocking hole adjacent to the mounting slot. The chip card holding mechanism includes a bracket and a receiving tray detachably assembled within the bracket via an unlocking assembly. The receiving tray includes a tray body, an operating portion formed at one end of the tray body, and a resisting block that is trapezoidal shaped and formed on the operating portion. The unlocking assembly includes an ejecting member and a pushing member assembled on one side of the bracket. The ejecting member includes a base body, an ejecting end and an ejecting portion. The ejecting portion resists against the resisting block, thereby locking the receiving tray within the bracket. The pushing member assembled to bracket and slidably resists against the ejecting end of the ejecting member.

17 Claims, 8 Drawing Sheets

CHIP CARD HOLDING MECHANISM AND PORTABLE ELECTRONIC DEVICE USING SAME

BACKGROUND

1. Technical Field

The present disclosure relates to holding mechanisms, particularly to a chip card holding mechanism for a portable electronic device.

2. Description of Related Art

Portable electronic devices such as mobile phones, tablet computers, typically employ at least one chip card (e.g., SIM card) for storing usable information, connecting to the internet, dialing calls, and the like. It is necessary to provide a chip card holding mechanism for holding/securing the chip card within the portable electronic device. The chip card holding mechanism usually defines a receiving space, an elastic sheet fitted in the receiving space, and a holding member rotatably assembled on the housing of the portable electronic device. The chip card can be received and held in the receiving space by the holding member, with the chip card resisting the elastic sheet. When detaching or replacing the chip card, the user must detach the outer cover of the portable electronic device first, thereby exposing the chip card holding mechanism, thus, it is inconvenient to detach and replace the chip card. In addition, the existing chip card holding mechanism has a complex structure, and the chip card holding mechanism may not unlock if the exerted pressure of the push by the user is not strong enough to rotate the holding member. On the other hand, too much pressure exerting on the cover may cause damages.

Therefore, there is room for improvement in the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of chip card holding mechanism and portable electronic device using the same. Moreover, in the drawings like reference numerals designate corresponding parts throughout the several views. Wherever possible, the same reference numerals are used throughout the drawings to refer to the same or like elements of an embodiment.

DETAILED DESCRIPTION

Figure 1:
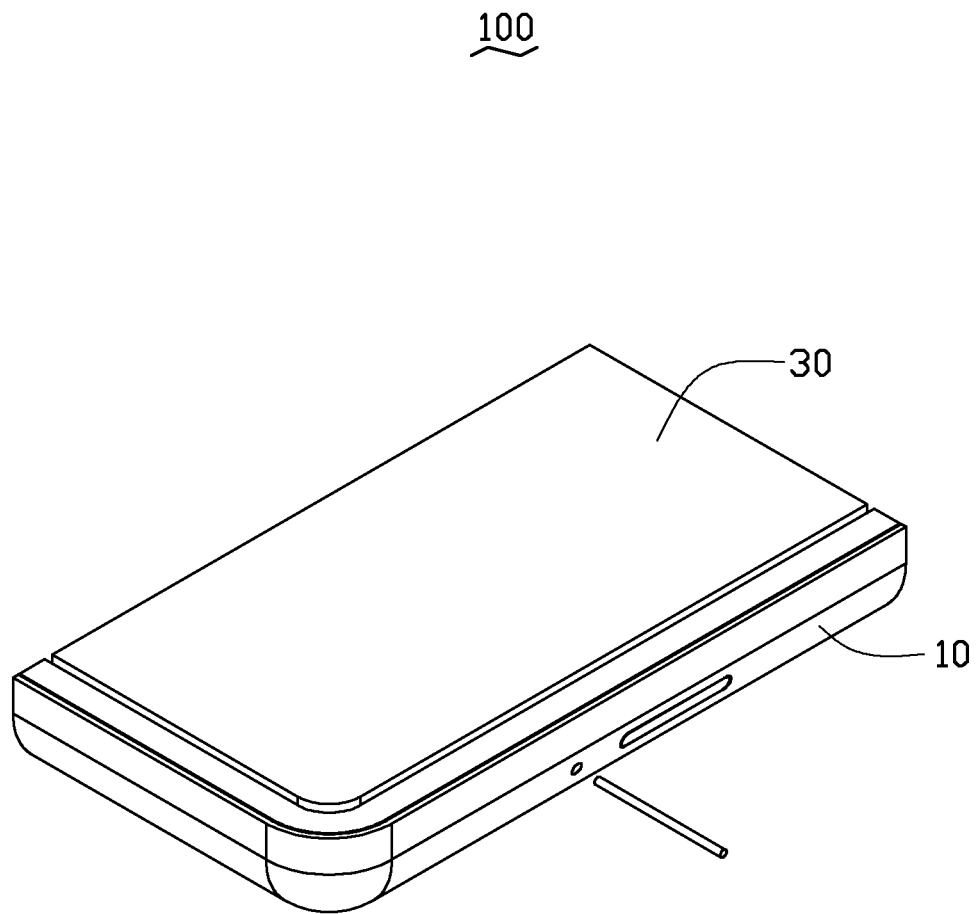
FIG. 1 is an isometric view of an embodiment of a portable electronic device.
Figure 2:
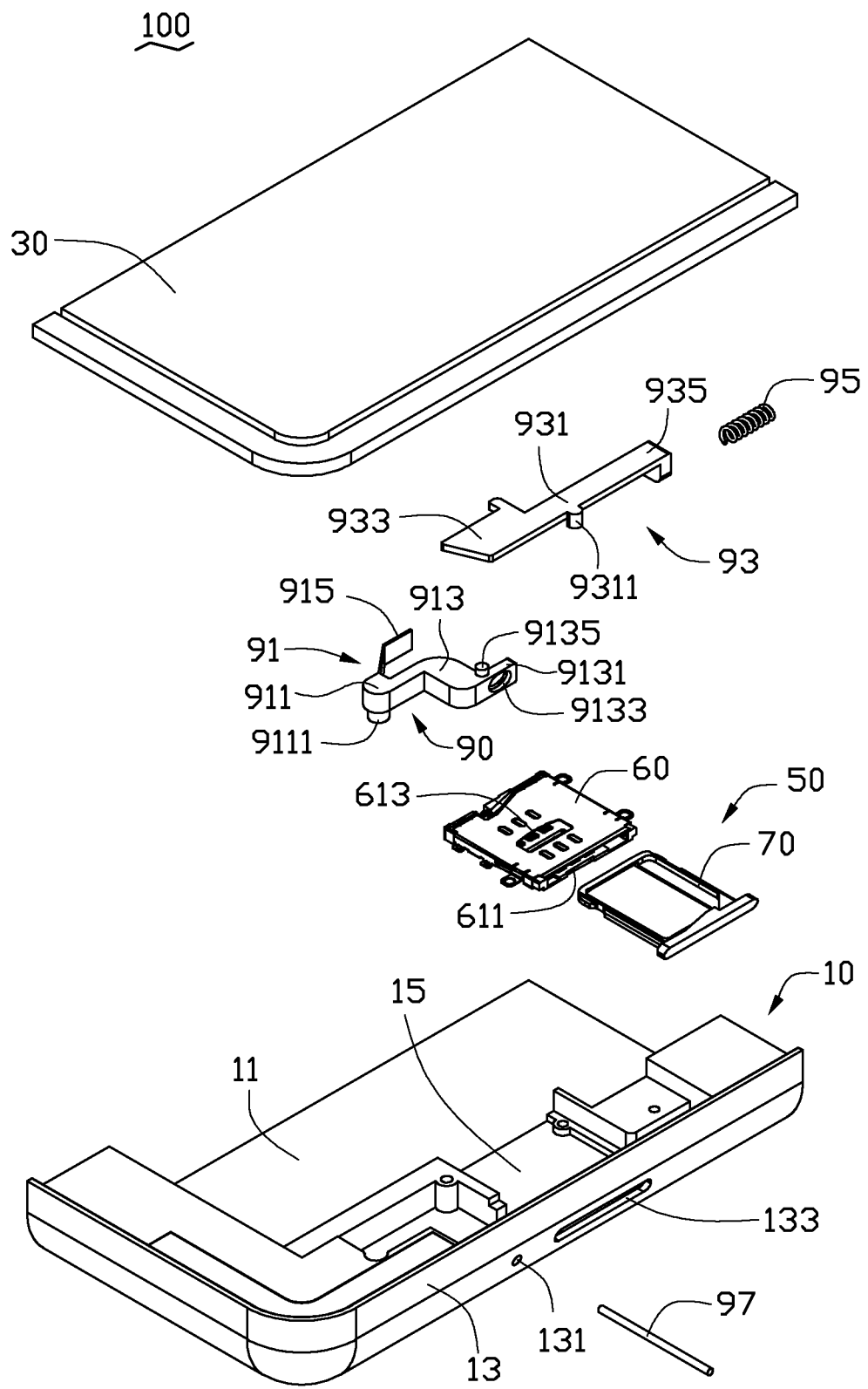
FIG. 2 is an exploded, isometric view of the portable electronic device of FIG. 1.

Referring to FIGS. 1 and 2, an embodiment of a portable electronic device 100 includes a housing 10, a liquid crystal display (LCD) panel 30, and a chip card holding mechanism 50. The LCD panel 30 is fixed on the housing 10. The chip card holding mechanism 50 is assembled within the housing 10 for holding a chip card (not shown). The portable electronic device 100 includes various modules for performing specific functions. However, for simplicity, only the modules related to the chip card holding mechanism 50 are described herein. The portable electronic device 100 may be a mobile phone, a tablet computer or other electronic device. The chip card may be one of various types of cards such as an SD Card, a multimedia card (MMC Card) or a SIM Card. In the illustrated embodiment, the portable electronic device 100 is a tablet computer, and the chip card is a SIM card.

The housing 10 includes a substantially rectangular bottom wall 11 and a peripheral wall 13 extending from a periphery of the bottom wall 11 and bending upward from the bottom wall 11. A mounting base 15 is formed on the bottom wall 11 and positioned adjacent to the peripheral wall 13, for mounting the chip card holding mechanism 50. An unlocking hole 131 and a thin substantially rectangular mounting slot 133 are separately defined through the peripheral wall 13 of the housing 10, and are positioned adjacent to the mounting base 15.

The chip card holding mechanism 50 is mounted on the mounting base 15 of the housing 10, and positioned adjacent to the mounting slot 133 of the peripheral wall 13 for receiving and holding the chip card inserted through the mounting slot 133, or for ejecting the chip card. The chip card holding mechanism 50 includes a bracket 60, a receiving tray 70 and an unlocking assembly 90. The bracket 60 is fixedly mounted on the mounting base 15 of the housing 10, the receiving tray 70 is detachably mounted on the bracket 60 via the unlocking assembly 90 and is capable of being ejected out or inserted into the mounting slot 133 of the housing 10.

Figure 3:
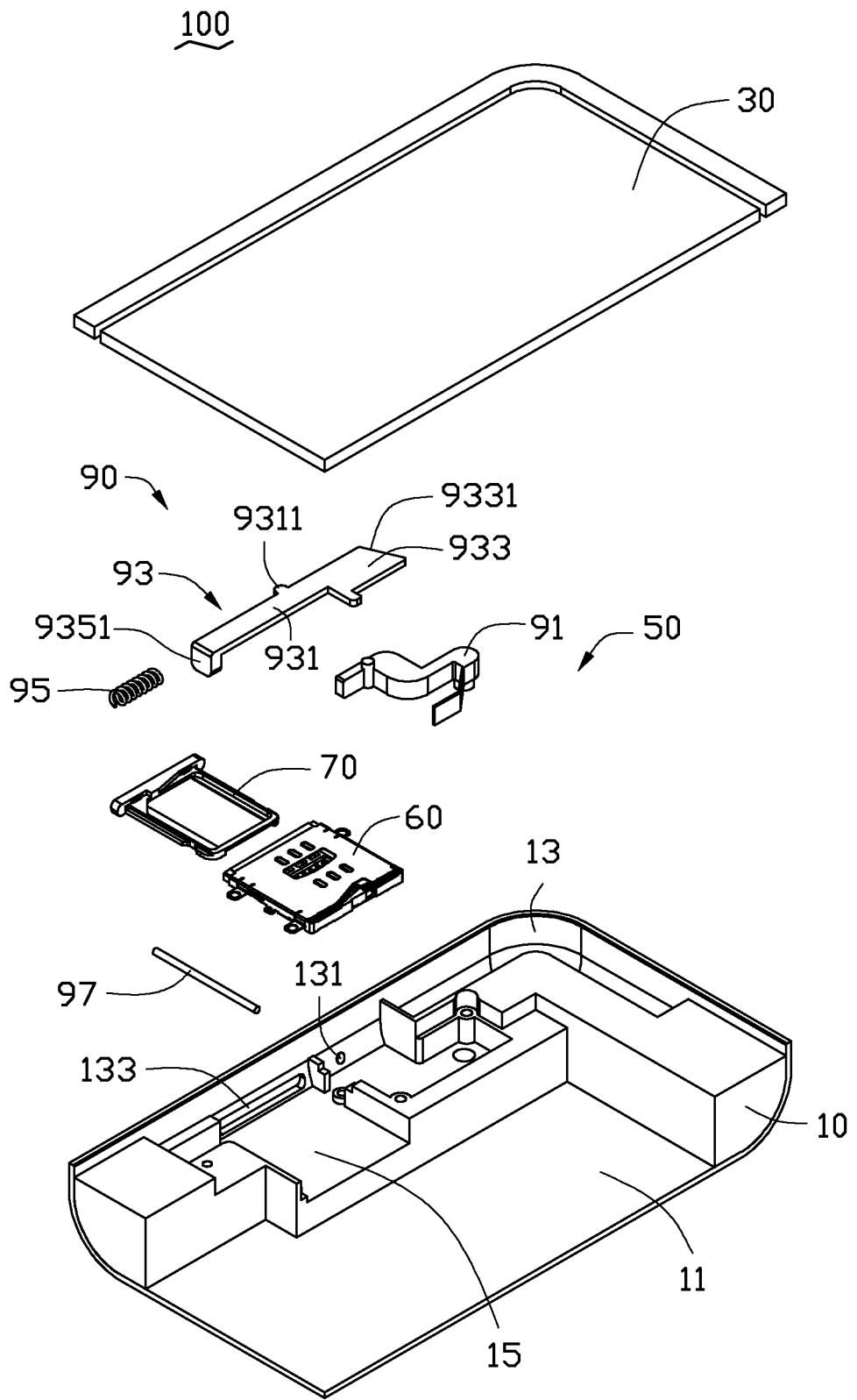
FIG. 3 is similar to FIG. 2, but viewed from another aspect.
Figure 4:
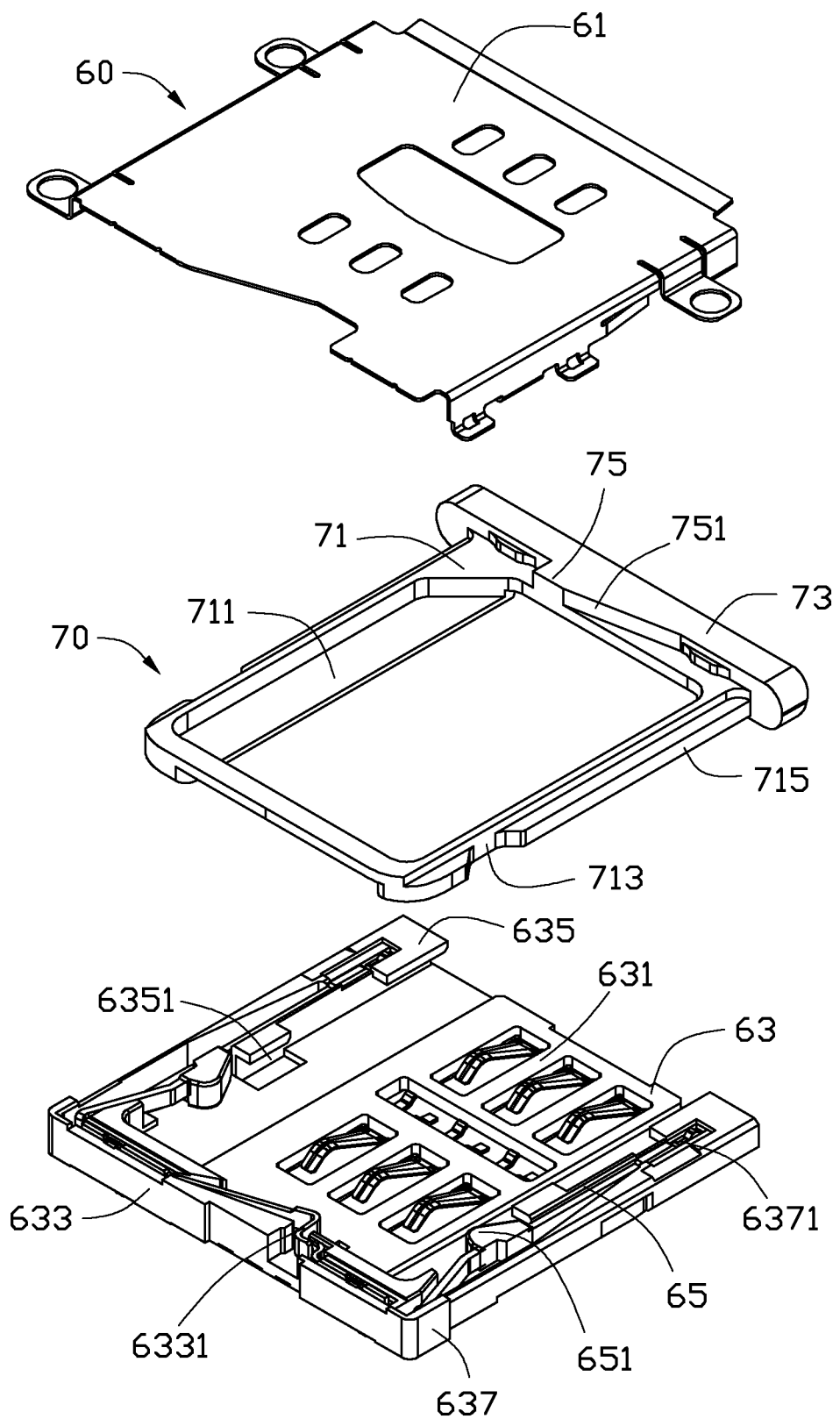
FIG. 4 is an exploded, isometric view of a bracket and a receiving tray of a chip card holding mechanism shown in FIG. 3.

Also referring to FIGS. 3 and 4, in the illustrated embodiment, the bracket 60 includes a top cover 61, a bottom cover 63 and two elastic members 65. The top cover 61 is mounted on the bottom cover 63 thereby defining a receiving space 613 (see FIG. 2) with the bottom cover 63. The receiving space 613 is configured for receiving the receiving tray 70 and has a receiving opening 611 aligning with the mounting slot 133 of the housing 10. In use, the chip card is placed on the receiving tray 70 and may be inserted into and accommodated within the receiving space 613 of the bracket 60. The two elastic members 65 are oppositely mounted to one end of the bottom cover 63 and elastically resist against the receiving tray 70.

Figure 5:
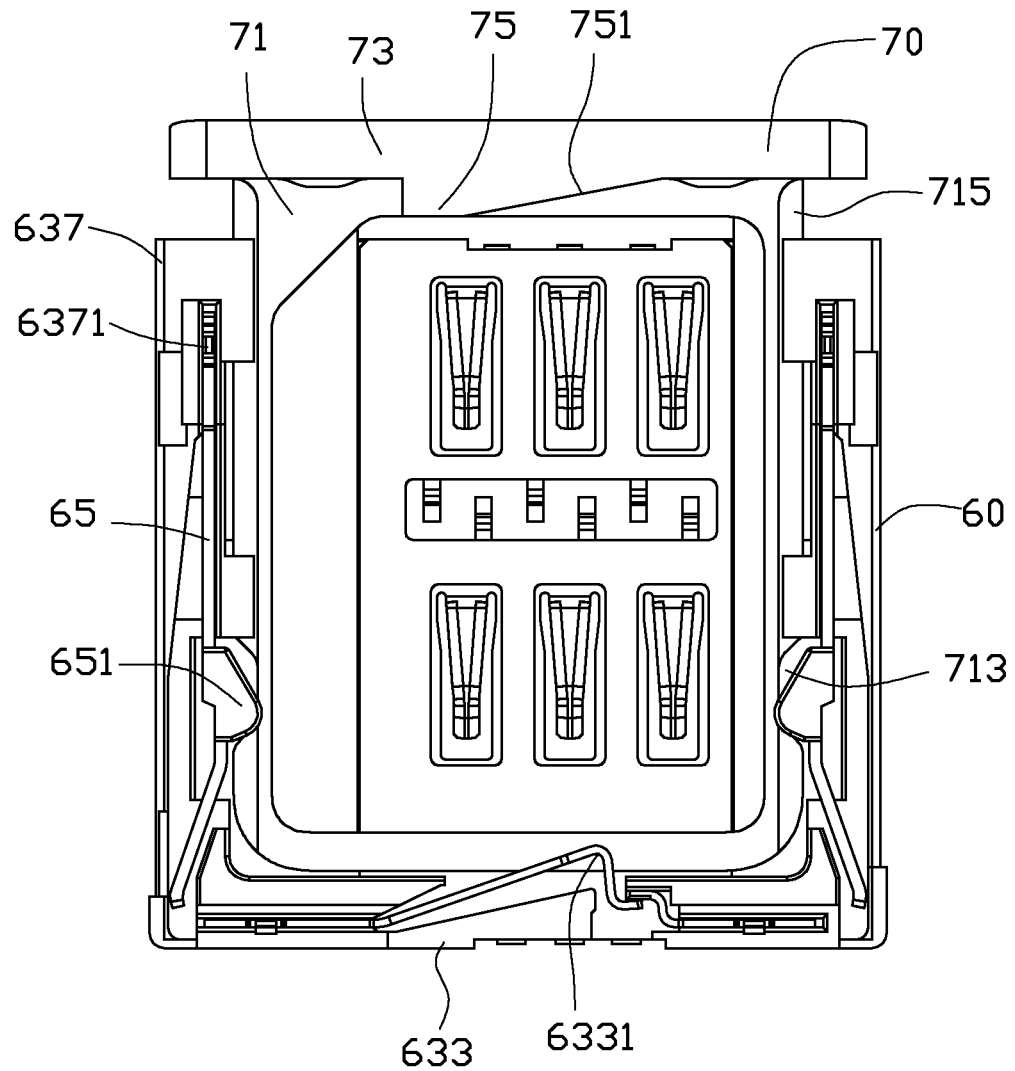
FIG. 5 is an isometric view of the chip card holding mechanism of FIG. 4 partially assembled.

Also referring to FIGS. 4-5, the bottom cover 63 includes a bottom body 631, a resisting portion 633, two guide portions 635 and two latching portions 637. The bottom body 631 is a substantially rectangular board, for supporting the receiving tray 70. The resisting portion 633 is formed at one end of the bottom body 631 and positioned opposite to the receiving opening 611. A bent elastic strip 6331 is detachably mounted to the resisting portion 633, and positioned toward the receiving opening 611 at the opposite end of the bottom cover 63 for elastically resisting against the receiving tray 70. In one embodiment, the elastic strip 6331 can be integrally formed with the resisting portion 633. The two guide portions 635 are oppositely disposed at two sides of the bottom body 631 and form two opposite guide slots 6351 in the bottom body 631 at two sides of the bottom body 631. The two latching portions 637 are oppositely disposed on the two guide portions 635 and each guide portion 635 defines an assembling slot 6371 for assembling the corresponding elastic member 65. In the illustrated embodiment, the elastic member 65 is a bent elastic sheet and includes an elastic protrusion 651 formed in the middle thereof, for resisting against the receiving tray 70.

The receiving tray 70 is slidably assembled within the receiving space 613 of the bracket 60, and includes a tray body 71, an operating portion 73 formed at one end of the tray body 71, and a resisting block 75. The tray body 71 defines an accommodating space 711 for receiving the chip card. Two guiding bars 715 are oppositely formed on two sides of the tray body 71 corresponding to the two guide slots 6351 of the bottom cover 63, such that, the tray body 71 is capable of being slidably mounted to the bottom cover 63 of the bracket 60. Two latching slots 713 are oppositely defined in two sides of the tray body 71 corresponding to the two latching portions 637 of the bracket 60 and positioned away from the operating portion 73 end. As the receiving tray 70 is received within the receiving space 613 of the bracket 60, the elastic protrusions 651 of the two elastic members 65 latch into the corresponding two latching slots 713 of the receiving tray 70. The shape of the operating portion 73 is substantially the same as that of the mounting slot 133 of the housing 10, such that, as the receiving tray 70 is received within the receiving space 613 of the bracket 60, the operating portion 73 is received within the mounting slot 133 of the housing 10. The resisting block 75 is trapezoidal and formed on the operating portion 73 towards the accommodating space 711. The resisting block 75 has an inclined resisting surface 751.

Also referring to FIGS. 2 and 3, the unlocking assembly 90 is mounted on the mounting base 15 of the housing 10 and slidably resists against the receiving tray 70. The unlocking assembly 90 includes a pushing member 91, an ejecting member 93, a resilient member 95 and an unlocking member 97. The pushing member 91 is hinged to the mounting base 15. The ejecting member 93 is slidably mounted to the mounting base 15 via the resilient member 95. One end of the ejecting member 93 resists against the pushing member 91, and the opposite other end of the ejecting member 93 resists against the resilient member 95. In the illustrated embodiment, the unlocking member 97 is a cylindrical rod attached to the portable electronic device 100, for unlocking the chip card holding mechanism 50.

The pushing member 91 includes a base portion 911, an unlock portion 913 extending from one end of the base portion 911, and an angled support portion 915 extending from the opposite other end of the base portion 911. A pivotal shaft 9111 is formed on the base portion 911 for rotatably hinging the pushing member 91 to the mounting base 15 of the housing 10. A substantially rectangular resisting arm 9131 extends from the unlock portion 913 in a direction parallel to the base portion 911. An unlock slot 9133 is recessed from the resisting arm 9131 and positioned away from the base portion 911 side, corresponding to the unlocking hole 131 of the housing 10. A cylindrical resisting post 9135 is formed on one side surface of the resisting arm 9131 away from the pivotal shaft 9111 and is parallel to the pivotal shaft 9111 of the base portion 911. The support portion 915 is an angled elastic strip made of elastic material.

The ejecting member 93 includes a bar shaped base body 931, an ejecting end 933 and a resisting end 935 opposite to the ejecting end 933. An ejecting portion 9311 is formed in the middle of one side surface of the base body 931 for slidably resisting against the inclined resisting surface 751 of the resisting block 75 of the receiving tray 70. The ejecting end 933 defines an inclined ejecting surface 9331 for slidably resisting against the resisting post 9135 of the pushing member 91.

Figure 6:
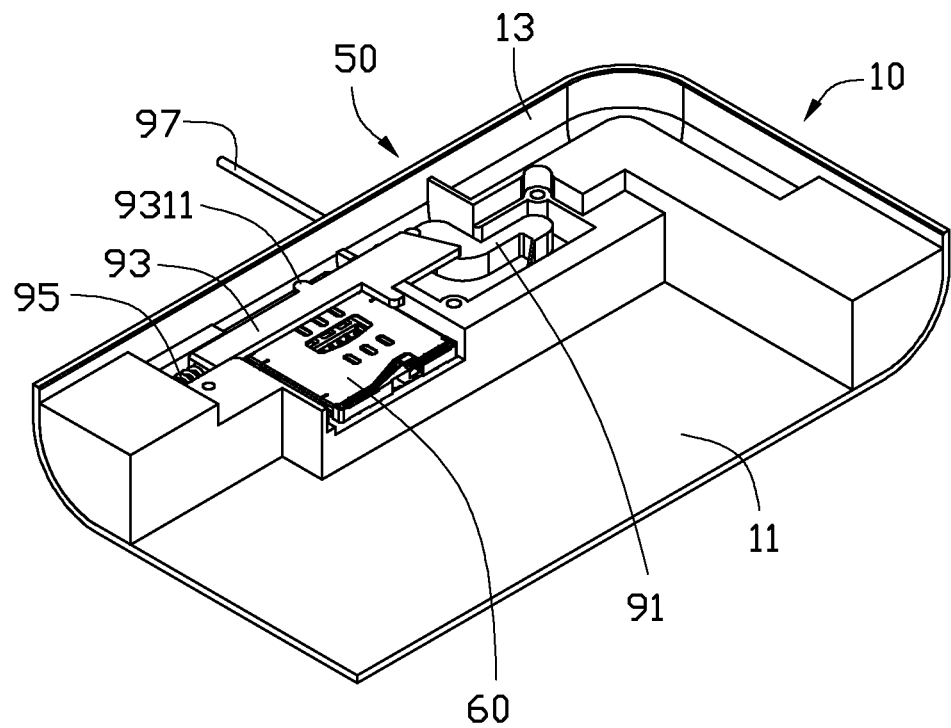
FIG. 6 is an isometric view of the assembled chip card holding mechanism.
Figure 7:
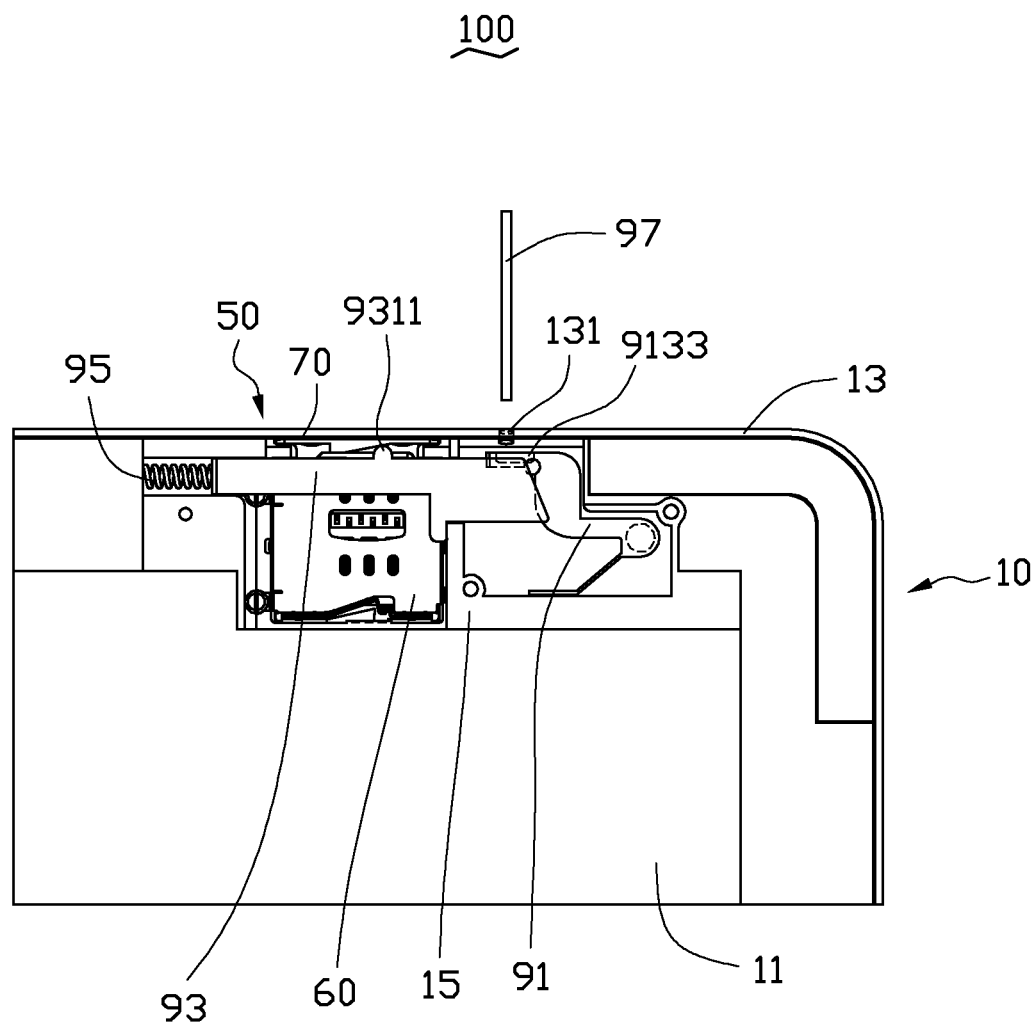
FIG. 7 is similar to FIG. 6, but viewed from top view.

Also referring to FIGS. 6 and 7, when assembling the chip card holding mechanism 50, the bracket 60 is first mounted on the mounting base 15 of the housing 10, the receiving opening 611 of the bracket 60 aligns with the mounting slot 133 of the housing 10. The unlocking assembly 90 is then mounted to the mounting base 15 of the housing 10 and positioned adjacent to the unlocking hole 131 and the mounting slot 133. The pushing member 91 is hinged to the mounting base 15 and positioned on one side of the bracket 60. The support portion 915 of the pushing member 91 elastically resists against the mounting base 15. The ejecting member 93 is slidably mounted upon the mounting base 15 via the resilient member 95. The ejecting end 933 of the ejecting member 93 slidably resists against the resisting post 9135 of the pushing member 91. The opposite resisting end 935 of the ejecting member 93 resists against the resilient member 95. Finally, the receiving tray 70 is slidably inserted into the mounting slot 133 of the housing 10 and received within the receiving space 613 of the bracket 60. The two guiding bars 715 of the receiving tray 70 slidably engage with the corresponding two guide slots 6351 of the bracket 60, the elastic protrusions 651 of the two elastic members 65 of the bracket 60 latch into the corresponding two latching slots 713 of the receiving tray 70, thereby applying spring pressure to lock the receiving tray 70 within the receiving space 613 of the bracket 60, to finish the assembly of the chip card holding mechanism 50. The ejecting portion 9311 of the ejecting member 93 slidably resists against the inclined resisting surface 751 of the resisting block 75 of the receiving tray 70.

Figure 8:
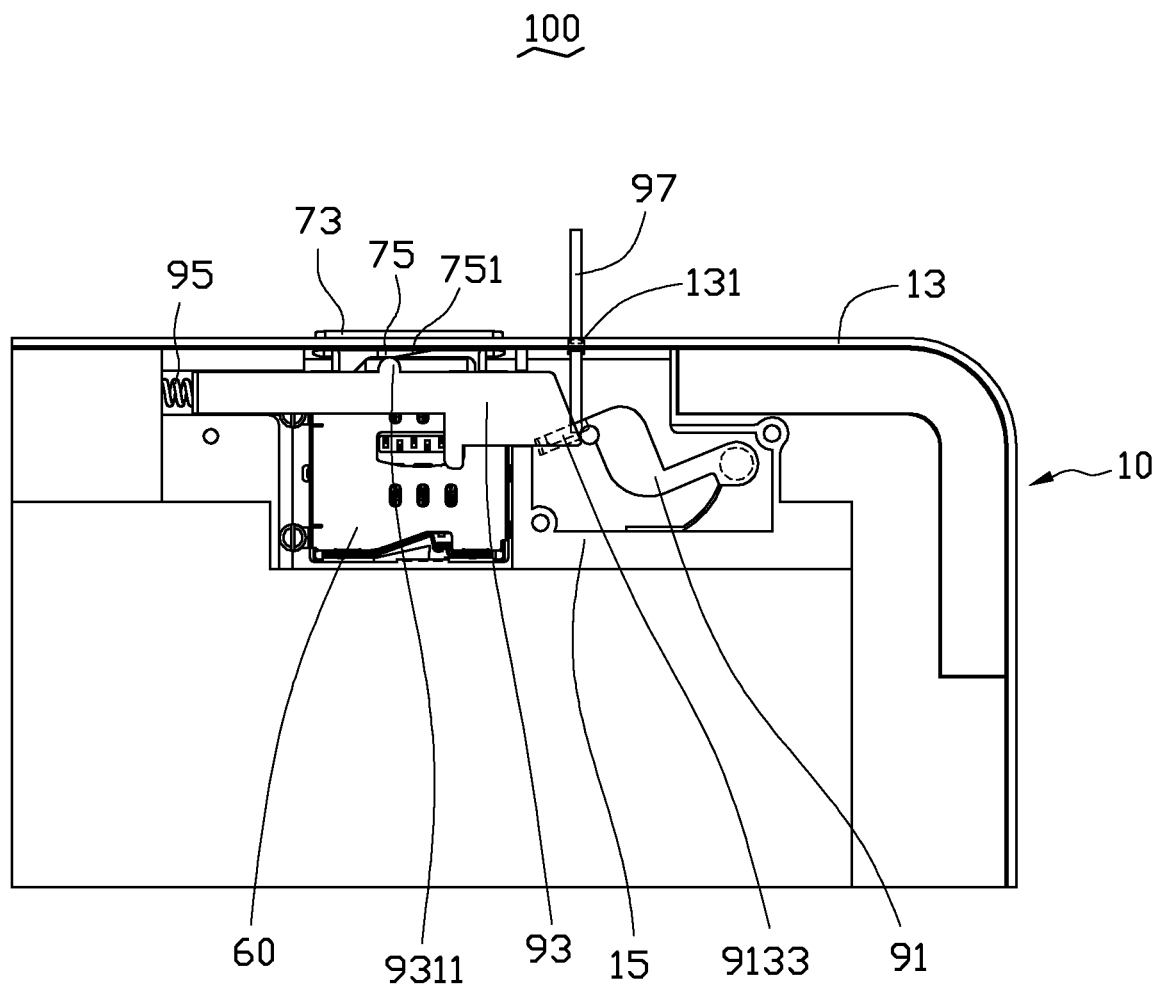
FIG. 8 shows a top view of the chip card holding mechanism in use.

Also referring to FIG. 8, when ejecting the receiving tray 70, one end of the unlocking member 97 is inserted into the unlocking hole 131 of the housing 10, and further engaged into the unlock slot 9133 of the unlock portion 913 of the pushing member 91. The unlock portion 913 of the pushing member 91 is pushed, thereby forcing the pushing member 91 to rotate relative to the mounting base 15 of the housing 10. Meanwhile, the resisting post 9135 of the pushing member 91 slidably resists against the inclined ejecting surface 9331 of the ejecting end 933 of the ejecting member 93, thereby pushing the ejecting member 93 away from the pushing member 91. The ejecting portion 9311 slidably resists against the inclined resisting surface 751 of the resisting block 75 of the receiving tray 70, thereby ejecting the receiving tray 70 from the receiving space 613 of the bracket 60 via the mounting slot 133.

The chip card holding mechanism 50 has a simple structure, and is easy to operate. The receiving tray 70 is detachably assembled within the receiving space 613 of the bracket 60 via the unlocking assembly 90 for receiving the chip card. The chip card can be easily ejected and inserted, by means of the receiving tray 70.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A chip card holding mechanism assembled within a housing, comprising:
   a bracket;
   an unlocking assembly, and
   a receiving tray detachably mounted to the bracket via the unlocking assembly; the receiving tray comprising a tray body, an operating portion formed at one end of the tray body, and a resisting block, the resisting block is trapezoidal, and formed on the operating portion; the resisting block has an inclined resisting surface;
   the unlocking assembly comprising:
      an ejecting member mounted upon the bracket and comprising a base body, an ejecting end and an ejecting portion formed on a side surface of the base body; the ejecting portion of the base body resisting against the corresponding inclined resisting surface of the resisting block of the receiving tray, thereby locking the receiving tray within the bracket; and a pushing member assembled aside of the bracket and slidably resisting against the ejecting end of the ejecting member.

2. The chip card holding mechanism of claim 1, wherein the ejecting end defines an inclined ejecting surface; the pushing member comprises a base portion, an unlock portion extending and bending from one end of the base portion, and a support portion extending and bending from the opposite other end of the base portion; a resisting post is formed on the unlock portion and slidably resisting against the corresponding inclined ejecting surface of the ejecting end of the ejecting member.

3. The chip card holding mechanism of claim 2, wherein the pushing member further comprises an unlock slot recessed from the unlock portion and positioned adjacent to the resisting post; the chip card holding mechanism further comprises an unlocking member inserted into the corresponding unlock slot of the pushing member thereby driving the pushing member to unlock the chip card holding mechanism.

4. The chip card holding mechanism of claim 2, wherein the chip card holding mechanism further comprises a resilient member, and the ejecting member is slidably mounted to the housing via the resilient member.

5. The chip card holding mechanism of claim 2, wherein the bracket comprises a top cover and a bottom cover, the top cover is mounted on the bottom cover thereby defining a receiving space with the bottom cover cooperatively; the receiving space has a receiving opening, the receiving tray is inserted into the receiving opening and slidably assembled within the receiving space of the bracket.

6. The chip card holding mechanism of claim 5, wherein the bottom cover comprises a bottom body and a resisting portion, the resisting portion is formed at one end of the bottom body and positioned opposite to the receiving opening; a bent elastic strip is detachably mounted to the resisting portion for elastically resisting against the corresponding receiving tray.

7. The chip card holding mechanism of claim 6, wherein the bottom cover further comprises two guide portions oppositely disposed at two sides of the bottom body thereby defining two opposite guide slots in the bottom body at two sides of the bottom body; the tray body comprises two guiding bars oppositely formed on two sides thereof corresponding to the two guide slots of the bottom cover, such that, the tray body is slidably mounted to the bottom cover of the bracket.

8. The chip card holding mechanism of claim 7, wherein the bottom cover further comprises two latching portions oppositely disposed on the two guide portions and each latching portion defines an assembling slot; the bracket further comprises two elastic members oppositely mounted to the two assembling slots of the bottom cover and elastically resisting against the corresponding receiving tray.

9. A portable electronic device, comprising:
a housing defining a mounting slot and an unlocking hole adjacent to the mounting slot; and
a chip card holding mechanism assembled within the housing for holding a chip card, the chip card holding mechanism comprising:
a bracket mounted within the housing and positioned adjacent to the mounting slot and the unlocking hole;
a receiving tray comprising a tray body, an operating portion formed at one end of the tray body, and a resisting block, the resisting block is trapezoidal, and formed on the operating portion; the resisting block has an inclined resisting surface; and
an unlocking assembly detachably mounting the receiving tray within the bracket via the corresponding mounting slot of the housing; the unlocking assembly comprising:
an ejecting member mounted upon the bracket and comprising a base body, an ejecting end and an ejecting portion formed on a side surface of the base body; the ejecting portion of the base body resisting against the corresponding inclined resisting surface of the resisting block of the receiving tray, thereby locking the receiving tray within the bracket; and
a pushing member assembled aside of the bracket and slidably resisting against the ejecting end of the ejecting member.

10. The chip card holding mechanism of claim 9, wherein the housing comprises a bottom wall, a peripheral wall and a mounting base formed on the bottom wall and positioned adjacent to the peripheral wall; the chip card holding mechanism is mounted on the mounting base, the unlocking hole and the mounting slot are separately defined through the peripheral wall of the housing, and are positioned adjacent to the mounting base; the bracket is fixedly mounted on the mounting base.

11. The chip card holding mechanism of claim 10, wherein the ejecting end defines an inclined ejecting surface; the pushing member comprises a base portion, the base portion is hinged to the mounting base, an unlock portion extending and bending from one end of the base portion, and a support portion extending and bending from the opposite other end of the base portion; a resisting post is formed on the unlock portion and slidably resisting against the corresponding inclined ejecting surface of the ejecting end of the ejecting member.

12. The chip card holding mechanism of claim 11, wherein the pushing member further comprises an unlock slot recessed from the unlock portion corresponding to the unlocking hole of the housing and positioned adjacent to the resisting post; the chip card holding mechanism further comprises an unlocking member inserted into the corresponding unlocking hole and the unlock slot of the pushing member, thereby driving the pushing member to unlock the chip card holding mechanism.

13. The chip card holding mechanism of claim 11, wherein the support portion of the pushing member is a bent elastic sheet made of elastic material and elastically resists against the mounting base; the chip card holding mechanism further comprises a resilient member, and the ejecting member is slidably mounted to the mounting base via the resilient member.

14. The chip card holding mechanism of claim 13, wherein the bracket comprises a top cover and a bottom cover, the top cover is mounted on the bottom cover thereby defining a receiving space with the bottom cover cooperatively; the receiving space has a receiving opening, the receiving tray is inserted into the receiving opening and slidably assembled within the receiving space of the bracket.

15. The chip card holding mechanism of claim 14, wherein the bottom cover comprises a bottom body and a resisting portion, the resisting portion is formed at one end of the bottom body and positioned opposite to the receiving opening; a bent elastic strip is detachably mounted to the resisting portion for elastically resisting against the corresponding receiving tray.

16. The chip card holding mechanism of claim 15, wherein the bottom cover further comprises two guide portions oppositely disposed at two sides of the bottom body thereby defining two opposite guide slots in the bottom body at two sides of the bottom body; the tray body comprises two guiding bars oppositely formed on two sides thereof corresponding to the two guide slots of the bottom cover, such that, the tray body is slidably mounted to the bottom cover of the bracket.

17. The portable electronic device of claim 16, wherein the bottom cover further comprises two latching portions oppositely disposed on the two guide portions and each latching portion defines an assembling slot; the bracket further comprises two elastic members oppositely mounted to the two assembling slots of the bottom cover and elastically resisting against the corresponding receiving tray.

* * * * *